(12) United States Patent
Comer et al.

(10) Patent No.: US 11,592,910 B2
(45) Date of Patent: Feb. 28, 2023

(54) MANAGING INPUT SENSITIVITY OF AN INFORMATION HANDLING SYSTEM

(71) Applicant: Dell Products L.P., Round Rock, TX (US)

(72) Inventors: Ryan Nicholas Comer, Pflugerville, TX (US); Tyler Ryan Cox, Austin, TX (US); Richard William Schuckle, Austin, TX (US); Marc Randall Hammons, Round Rock, TX (US); Jake Mitchell Leland, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 17/147,796

(22) Filed: Jan. 13, 2021

(65) Prior Publication Data
US 2022/0221945 A1   Jul. 14, 2022

(51) Int. Cl.
G06F 3/03   (2006.01)
G06F 9/48   (2006.01)
G06F 11/34   (2006.01)
G06F 11/30   (2006.01)

(52) U.S. Cl.
CPC .............. *G06F 3/03* (2013.01); *G06F 9/4881* (2013.01); *G06F 11/3051* (2013.01); *G06F 11/3485* (2013.01)

(58) Field of Classification Search
CPC ...... G06F 3/03; G06F 9/4881; G06F 11/3051; G06F 11/3485; G06F 11/3433; G06F 3/038; A63F 13/22; A63F 13/355; A63F 13/44; A63F 13/86; G06N 20/00
See application file for complete search history.

(56) References Cited

U.S. PATENT DOCUMENTS

2016/0378201 A1 *   12/2016   Baughman ................ G06F 8/38
                                                                    345/173

FOREIGN PATENT DOCUMENTS

CN            108062180 A  *   5/2018   ........... G06F 3/0416

* cited by examiner

*Primary Examiner* — Rodney Amadiz
(74) *Attorney, Agent, or Firm* — McDermott Will & Emery LLP

(57) ABSTRACT

Managing input sensitivity of an information handling system, including performing a calibration and configuration of an input sensitivity management model, including: identifying contextual data associated with the information handling system, the contextual data including i) system characteristics of the information handling system and ii) o user characteristics of a user of the information handling system; identifying historic states of the information handling system, the historic states including for each state in time of the information handling system, inputs to the information handling system and outputs of the information handling system based on the inputs to the information handling system; training, based on the contextual data and the historic states, the input sensitivity management model for determining an input sensitivity of the inputs to the information handling system; performing, after performing the calibration and configuration of the input sensitivity management model, a steady-state monitoring of the information handling system.

20 Claims, 3 Drawing Sheets

MANAGING INPUT SENSITIVITY OF AN INFORMATION HANDLING SYSTEM

BACKGROUND

Field of the Disclosure

The disclosure relates generally to an information handling system, and in particular, managing input sensitivity of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing input sensitivity of an information handling system, comprising: performing a calibration and configuration of an input sensitivity management model, including: identifying contextual data associated with the information handling system, the contextual data including i) one or more system characteristics of the information handling system and ii) one or more user characteristics of a user of the information handling system; identifying historic states of the information handling system, the historic states including for each state in time of the information handling system, inputs to the information handling system and outputs of the information handling system based on the inputs to the information handling system; training, based on the contextual data and the historic states, the input sensitivity management model for determining an input sensitivity of the inputs to the information handling system; performing, after performing the calibration and configuration of the input sensitivity management model, a steady-state monitoring of the information handling system, including: monitoring the contextual data of the information handling system; identifying a current state of the information handling system including current inputs to the information handling system and current outputs to the information handling system based on the current inputs to the information handling system; and in response to monitoring the contextual data of the information handling system and based on the current state of the information handling system, accessing the input sensitivity management model to determine the input sensitivity of the current inputs to the information handling system.

Other embodiments of these aspects include corresponding systems, apparatus, and computer programs, configured to perform the actions of the methods, encoded on computer storage devices.

These and other embodiments may each optionally include one or more of the following features. For instance, updating a data store storing the historic states of the information handling system to indicate, based on the current inputs to the information handling system, the corresponding input sensitivities of the current inputs. Ranking the current inputs to the information handling system based on the input sensitivity of each of the current inputs. Determining a prioritization of the inputs to the information handling system based on the ranking. After determining the input sensitivity of the current inputs to the information handling system, prioritizing processing workloads at the information handling system based on the prioritization of the inputs. Determining the prioritization of the inputs to the information handling system based on the ranking, a current input prioritization, and a current system resource utilization. The one or more system characteristics includes operating environment of the information handling system, information handling system workload, information handling system configuration, network characteristics associated with the information handling system, and resource utilization of the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
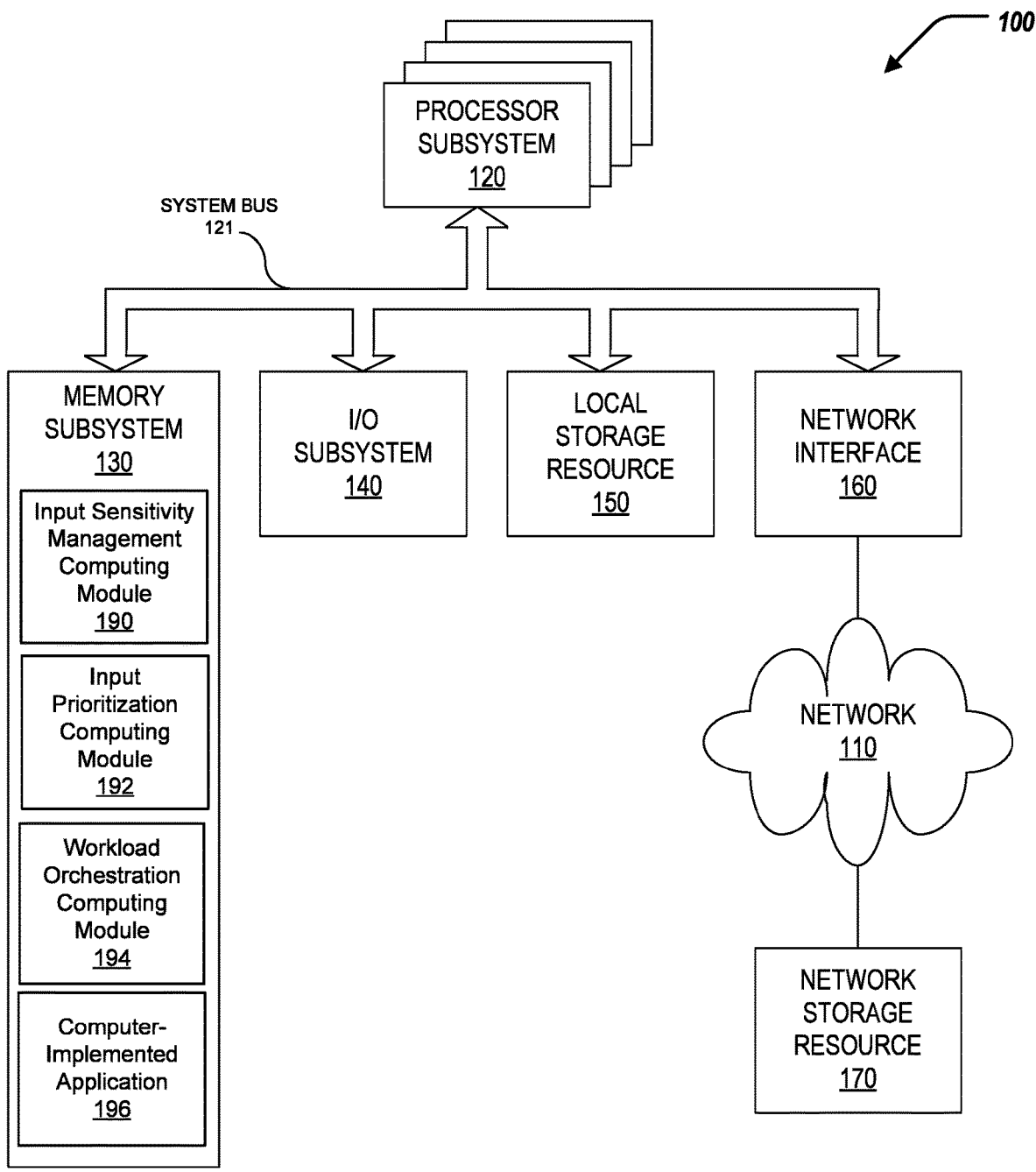
FIG. 1 is a block diagram of selected elements of an embodiment of an information handling system.

This disclosure discusses methods and systems for managing input sensitivity of an information handling system. In short, an input sensitivity of a particular input to the information handling system can change based on contextual data of the information handling system—e.g., operating environment, system workloads, user profiles, etc. of the information handling system. The input sensitivity of an input can be determined as, in short, how much an output of the information handling system changes when a value of the input is changed. For example, when the information handling system is executing a gaming application, the input latency of a game controller input can be an input to the system. The output of the information handling system can be a video stream of the gaming application. The input sensitivity can be how the game controller input latency effects the video stream. When the input sensitivity of each of the inputs to the information handling system are measured and reported, the information handling system can utilize such information to improve the performance of the information handling system by prioritizing processing workloads at the information handling system (e.g., modulating sample rates for specific inputs).

The input sensitivity management computing module can determine the current input sensitivity of inputs to the information handling system using a machine learning model that learns (or models) the behavior of the information handling system based on the inputs, outputs, and characteristics of the system. The output of the machine learning model is the input sensitivity for each input to the information handling system. The current system state can be stored in a database for future inferences and retraining the model (inputs, input sensitivity, outputs, system characteristics). After the input sensitivity of the inputs are determined, the input prioritization computing module can prioritize the inputs, including ranking of the inputs based on their input sensitivity. The current resource utilization of the information handling system and the current input prioritizations can be compared to the input priorities of the new inputs. The workload orchestration computing module can redistribute resources at the information handling system based on the rankings to facilitate maintaining desired values of the high input-sensitivity inputs.

Specifically, this disclosure discusses a system and a method for managing input sensitivity of an information handling system, including performing a calibration and configuration of an input sensitivity management model, including: identifying contextual data associated with the information handling system, the contextual data including i) one or more system characteristics of the information handling system, ii) one or more user characteristics of a user of the information handling system and iii) one or more environmental characteristics of the environment that the information handling system is operating in; identifying historic states of the information handling system, the historic states including for each state in time of the information handling system, inputs to the information handling system and outputs of the information handling system based on the inputs to the information handling system; training, based on the contextual data and the historic states, the input sensitivity management model for determining an input sensitivity of the inputs to the information handling system; performing, after performing the calibration and configuration of the input sensitivity management model, a steady-state monitoring of the information handling system, including: monitoring the contextual data of the information handling system; identifying a current state of the information handling system including current inputs to the information handling system and current outputs to the information handling system based on the current inputs to the information handling system; in response to monitoring the contextual data of the information handling system and based on the current state of the information handling system, accessing the input sensitivity management model to determine the input sensitivity of the current inputs to the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
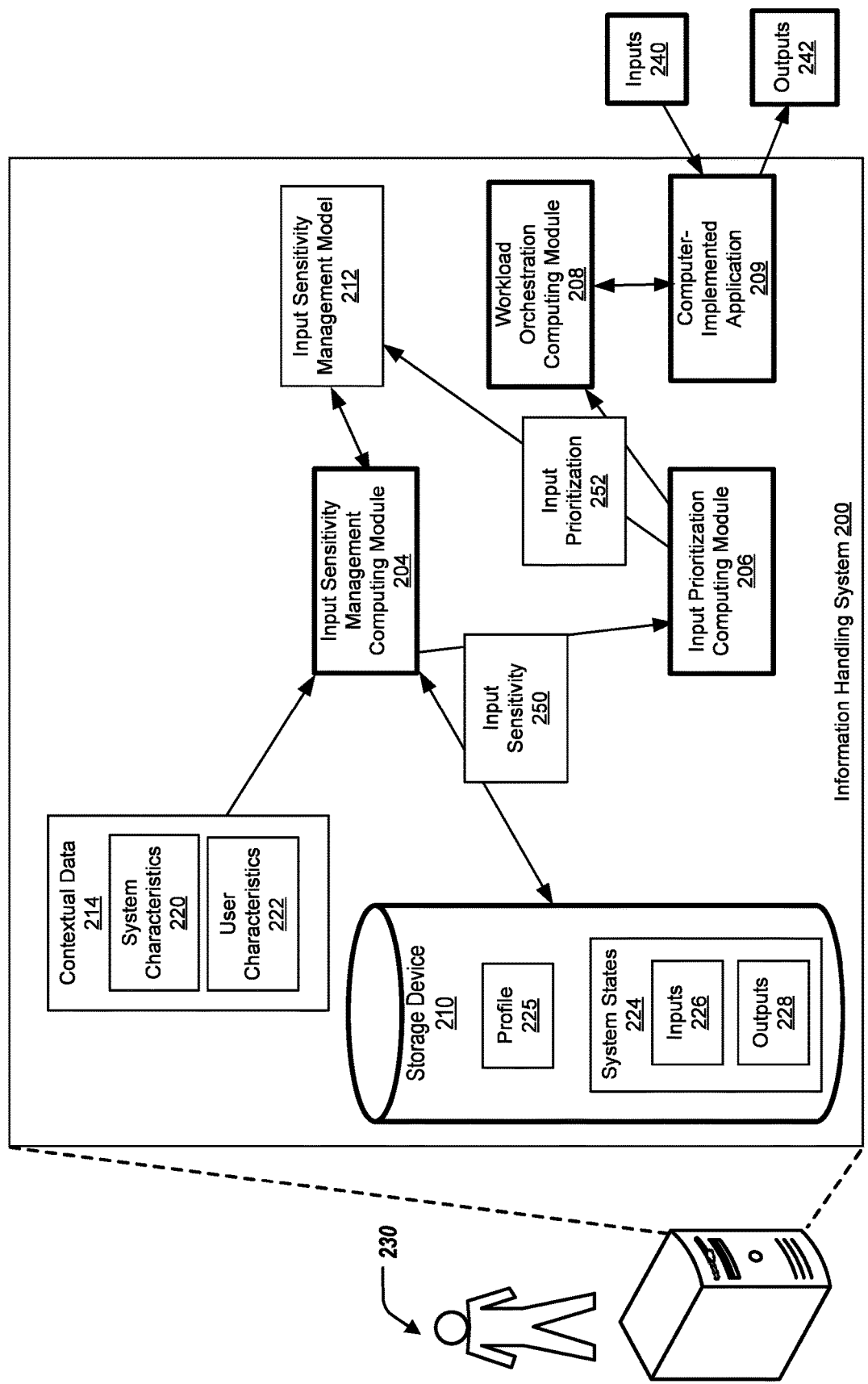
FIG. 2 illustrates a block diagram of the information handling system for managing input sensitivity of the information handling system.
Figure 3:
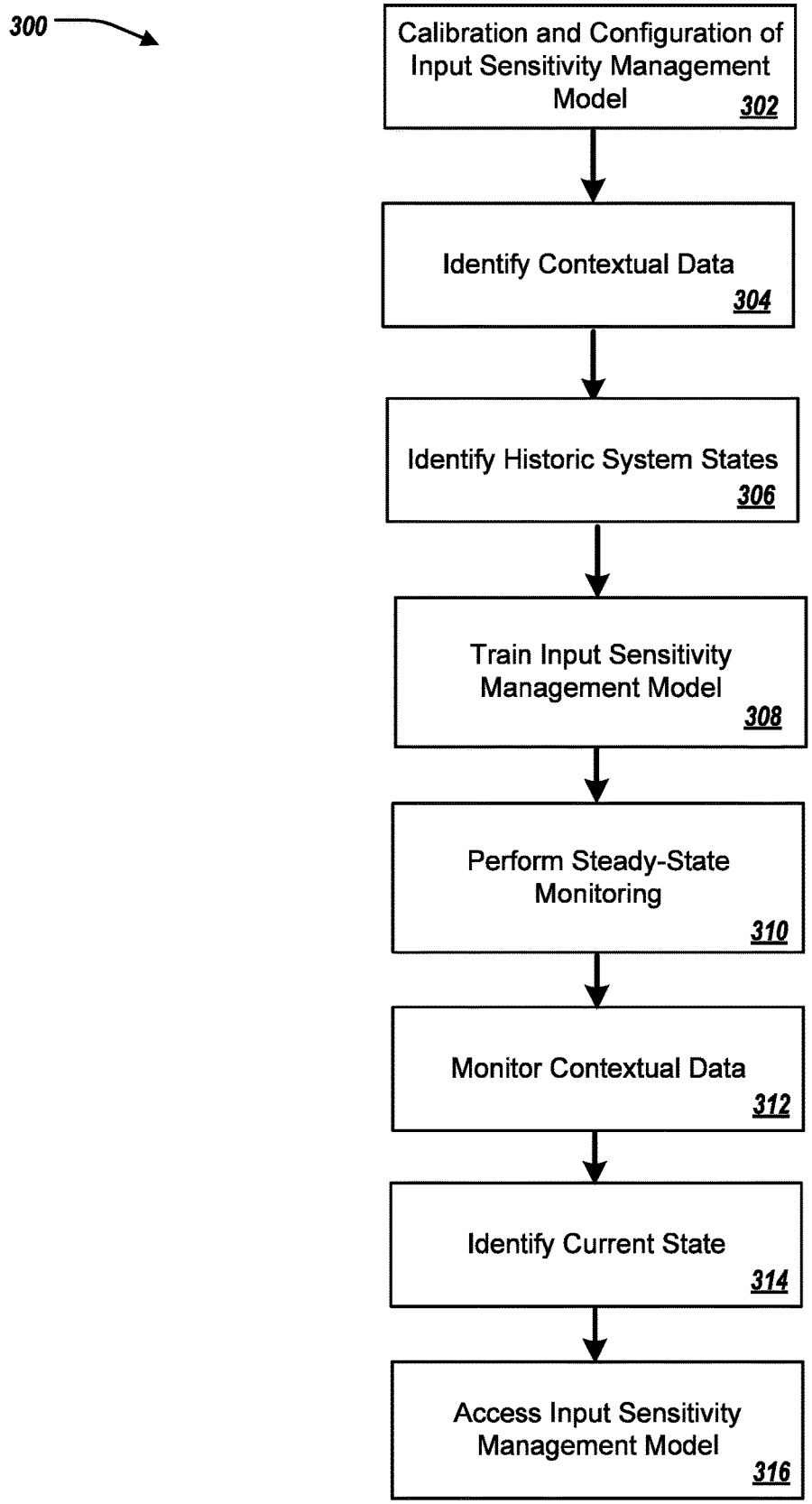
FIG. 3 illustrates a method for managing input sensitivity of the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The memory subsystem 130 can include an input sensitivity management computing module 190. The input sensitivity management computing module 190 can include a computer-executable program (software). The input sensitivity management computing module 190 can be executed by the processor subsystem 120. The memory subsystem 130 can further include an input prioritization computing module 192. The input prioritization computing module 192 can include a computer-executable program (software). The input prioritization computing module 192 can be executed by the processor subsystem 120. The memory subsystem 130 can further include an workload orchestration computing module 194. The workload orchestration computing module 194 can include a computer-executable program (software). The workload orchestration computing module 194 can be executed by the processor subsystem 120. The memory subsystem 130 can further include a computer-implemented application 196. The computer-implemented application 196 can include a computer-executable program (software). The computer-implemented application 196 can be executed by the processor subsystem 120.

In short, an input sensitivity of a particular input to the information handling system 100 can change based on contextual data of the information handling system 100— e.g., operating environment, system workloads, user profiles, etc. of the information handling system 100. The input sensitivity of an input can be determined as, in short, how much an output of the information handling system 100 changes when a value of the input is changed. For example, when the information handling system 100 is executing a gaming application (the computer-implemented application 196), the input latency of a game controller input can be an input to the system. The output of the information handling system 100 can be a video stream of the gaming application (the computer-implemented application 196). The input sensitivity can be how the game controller input latency effects the video stream. When the input sensitivity of each of the inputs to the information handling system 100 are measured and reported, the information handling system 100 can utilize such information to improve the performance of the information handling system 100 by prioritizing processing workloads at the information handling system 100 (e.g., modulating sample rates for specific inputs).

Specifically, the input sensitivity management computing module 190 can determine the current input sensitivity of inputs to the information handling system 100 using a machine learning model that learns (or models) the behavior of the information handling system 100 based on the inputs, outputs, and characteristics of the system. The output of the machine learning model is the input sensitivity for each input to the information handling system 100. The current system state can be stored in a database for future inferences (inputs, input sensitivity, outputs, system characteristics). After the input sensitivity of the inputs are determined, the input prioritization computing module 192 can prioritize the inputs, including ranking of the inputs based on their input sensitivity. The current resource utilization of the information handling system 100 and the current input prioritizations can be compared to the input priorities of the new inputs. The workload orchestrion computing module 194 can redistribute resources at the information handling system 100 based on the rankings to facilitate maintaining desired values of the high input-sensitivity inputs.

Turning now to FIG. 2, FIG. 2 illustrates a computing environment 201 (and/or physical environment 201) including an information handling system 200. The information handling system 200 can be similar to the information handling system 100 of FIG. 1. The information handling system 200 can include an input sensitivity management computing module 204, an input prioritization computing module 206, a workload orchestration computing module 208, a computer-implemented application 209, and a storage device 210. The input sensitivity management computing module 204 can be in communication with the input prioritization computing module 206 and the storage device 210. The input prioritization computing module 206 can be in communication with the input sensitivity management computing module 204 and the workload orchestration computing module 208. The workload orchestration computing module 208 can be in communication with the input prioritization computing module 206 and the computer-implemented application 209.

In some examples, the input sensitivity management computing module 204 can be the same as, or include, the input sensitivity management computing module 190 of FIG. 1. In some examples, the input prioritization computing module 206 can be the same as, or include, the input prioritization computing module 192 of FIG. 1. In some examples, the workload orchestration computing module 208 can be the same as, or include, the workload orchestration computing module 194 of FIG. 1. In some examples, the computer-implemented application 209 can be the same as, or include, the computer-implemented application 196 of FIG. 1.

In some embodiments, the input sensitivity management computing module 204 can perform a calibration and configuration of an input sensitivity management model 212. Specifically, performing the calibration and the configuration of the input sensitivity management model 212 can include identifying contextual data 214 associated with the information handling system 200.

In some examples, the contextual data 214 can include system characteristics 220 of the information handling system 200. The system characteristics 220 can include an operating environment of the information handling system 200. For example, the operating environment can include the operating system of the information handling system 200, and/or any application that is executing by/on the information handling system 200 (i.e., the computer-implemented application 209). For example, the operating environment can include workloads and other processes that are currently being executed by the information handling system 200. The system characteristics 220 can include a (system) configuration of the information handling system 200. For example, the system configuration of the information handling system 200 can include hardware of the information handling system 200. For example, the hardware can include graphics capabilities of the information handling system 200, display devices, and/or controllers coupled with/to the information handling system 200. The system characteristics 220 can include network characteristics associated with the information handling system 200. For example, the network characteristics can include a location of a network connection by the information handling system 200 (e.g., to the Internet)— home, office, or other location. The network characteristics can include workloads and other processes performed by the network. The system characteristics 220 can include resource utilization associated with the information handling system 200. For example, the resource utilization can include overall computing load at the information handling system 200, including a percentage of used and unused computing load at the information handling system 200.

In some examples, the contextual data 214 can include user characteristics 222 of a user 230 associated with the information handling system 200 (e.g., "using" or interacting with the information handling system 200). The user characteristics 222 can include a user profile of the user 230. The user profile (or user persona) 225 can be stored by the storage device 210, and can include a characterization of the user 230. The user profile 225 can indicate types of applications (e.g., the computer-implemented application 209) used by the user 230 (e.g., types of games the user 230 plays). The user profile 225 can further indicate metrics associated with interaction by the user 230 with the computer-implemented application 209, including duration, frequency, and similar.

In some examples, the contextual data 214 can include operating environment characteristics of the environment 201 that the information handling system 200 is operating in. That is, the contextual data 214 can include characteristics outside of the information handling system 200 such as temperature and similar of the environment 201.

The input sensitivity management computing module 204 can identify historic system states 224 of the information handling system 200. Specifically, the storage device 210 can store, or provide access to, the system states 224. The historic system states 224 can include, for each state in time of the information handling system (e.g., over a period of time), input data 226 (or inputs 226) to the information handling system 200 and output data 228 (or outputs 228) of the information handling system 200 based on the inputs 226 to the information handling system 200. For example, when the computer-implemented application 209 includes a gaming application, the historic input data 226 can include inputs to the gaming application such as game controller inputs, including latency of such inputs, and voice input from a microphone, including latency of such input; and the historic output data 228 can include outputs of the gaming application such as a video stream (e.g., provided to a display device), audio output (e.g., provided to speakers/headphones), and haptics/lighting output (e.g., provided to the game controller).

The input sensitivity management computing module 204 can train, based on the contextual data 214, the input sensitivity management model 212. Specifically, the input sensitivity management computing module 204 can train, based on the contextual data 214 previously identified, the input sensitivity management model 212 for determining an input sensitivity of inputs 226 to the information handling system. That is, the input sensitivity management computing module 204 can model the input sensitivity of the inputs 226 via the input sensitivity management model 212 based on the contextual data 214. For example, when the computer-implemented application 209 includes a gaming application, the input sensitivity management computing module 204 can generate the input sensitivity management model 212 to model the input sensitivity of the inputs 226 (e.g., a latency of game controller inputs, latency of voice input thru headset) based on the contextual data 214 of the information handling system 200. That is, the input sensitivity of the inputs 226 can be based on the contextual data 214. In other words, the sensitivity of the inputs 226 to the information handling system 200 with respect to the historical outputs 228 is based on the contextual data 214. That is, the sensitivity of the inputs 226 to the information handling system 200 with respect to the historical outputs 228 can increase or decrease based on the values of the contextual data 214.

In some examples, the input sensitivity management computing module 204 can train the input sensitivity management model 212 using a machine learning process, and/or a neural network (e.g., a convolutional neural network (CNN) or an artificial neural network (ANN)). That is, the input sensitivity management model 212 can include a machine learning model (machine learning algorithm). For example, the input sensitivity management computing module 204 can obtain contextual data 214 over a first time period, e.g., contextual data 214 such as the operating environment of the information handling system 200, information handling system 200 workload, information handling system 200 configuration, network characteristics associated with the information handling system 200, and resource utilization of the information handling system 200. Furthermore, the input sensitivity management computing module 204 can identify the historical system states 224 of the information handling system 200 in response to the contextual data 214 of the information handling system 200. The input sensitivity management computing module 204 can then train the input sensitivity management model 212 based on the contextual data 214 and the historic system states 224 (e.g., using a machine learning process, and/or a neural network).

For example, when the computer-implemented application 209 includes a gaming application, the input sensitivity computing module 204 can train the input sensitivity management model 212 based on the contextual data 214 (e.g., system characteristics 220 and user characteristics 222) and the system states 224 as it applies to the gaming application.

That is, the input sensitivity management model 212 can model the input sensitivity of the inputs (from historical inputs 226) to the gaming application such as latency of game controller inputs and latency of voice input from a microphone/headset based on the contextual data 214 of the information handling system and the outputs (from the historical outputs 228) from the gaming application such as a video stream. That is, the input sensitivity management model 212 can model how sensitive the output of the gaming application is in relation to the inputs to the gaming application—how much influence each of the inputs has on the output of the gaming application (the input sensitivity of the inputs to the gaming application).

The input sensitivity management computing module 204 can perform, after performing the calibration and configuration of the input sensitivity management model 212, a steady-state monitoring of the information handling system 200. Specifically, the input sensitivity management computing module 204 can monitor the contextual data 214 of the information handling system 200. In some examples, the input sensitivity management computing module 204 can monitor the contextual data 214 such as the system characteristics 220 and the user characteristics 222.

The input sensitivity management computing module 204 can identify a current state of the information handling system 200 including current inputs 240 to the information handling system 200 and current outputs 242 of the information handling system 200 based on the current inputs 240 to the information handling system 200. That is, the input sensitivity management computing module 204 can identify i) the inputs 240 to the computer-implemented application 209 and ii) the outputs 242 of the computer-implemented application 209. For example, when the computer-implemented application 209 includes a gaming application, the inputs 240 to the computer-implemented application 209 can be game controller inputs and voice input from a microphone; and the outputs 242 of the gaming application can be a video stream (e.g., provided to a display device), audio output (e.g., provided to speakers/headphones), and haptics/lighting output (e.g., provided to the game controller). The outputs 242 of the gaming application can be correlated (or result from, or based upon) the inputs 240 to the gaming application—for example, as the user provides game controller inputs, the video stream of the gaming application is adjusted accordingly.

The input sensitivity management computing module 204 can, in response to monitoring the contextual data 214 and based on the current state of the information handling system 200, access the input sensitivity management model 212 to determine the input sensitivity of the current inputs 240 to the information handling system 200. That is, the input sensitivity management computing module 204 can apply the input sensitivity management model 212 to the inputs 240, and based on the contextual data 214, determine the input sensitivity of the current inputs 240. That is, the input sensitivity management model 212 can model (utilizing machine learning) the input sensitivity of the inputs 240 based on the contextual data 214 to the information handling system 200 (the input sensitivity management model 212 being trained on historical system states 224 and the contextual data 214 as mentioned prior). In other words, the input sensitivity management model 212 can model the input sensitivity of the inputs 240 to the computer-implemented application 209 based on the contextual data 214 and the historical system states 224. In other words, the input sensitivity management model 212 can model the sensitivity of the inputs 240 to the information handling system 200 with respect to the outputs 242 based on the contextual data 214 and the historical states 224.

For example, when the computer-implemented application 209 includes a gaming application, the inputs to the gaming application can include game controller inputs and voice input from a microphone. The input sensitivity management computing module 204 can access the input sensitivity management model 212 to determine the input sensitivity of the inputs (game controller inputs and voice input). The input sensitivity management model 212 can model the input sensitivity of the inputs 240 based on i) the contextual data 214 and ii) the historical system states 224. That is, the input sensitivity management model 212 can model the sensitivity of the output of the gaming application in relation to the inputs to the gaming application—how much influence each of the inputs has on the output of the gaming application (the input sensitivity of the inputs to the gaming application) in view of the contextual data 214. For example, the input sensitivity management model 212 can model the sensitivity the video stream of the gaming application in relation to the controller inputs and the audio input to the gaming application. For example, the video stream can have greater sensitivity to the latency of the controller inputs as compared to the latency of the audio input in view of the contextual data 214. Thus, the input sensitivity management model 212 can model the sensitivity of the inputs 240 to the output 242 based on i) latency of the inputs 240 and the ii) the contextual data 214.

In some examples, the input sensitivity management computing module 204 can output the input sensitivity 250 of the inputs 240 (i.e., after the input sensitivity management model 212 is applied to model the input sensitivity of the inputs 240 to the information handling system 200). The input sensitivity management computing module 204 can update the storage device 210 to indicate, based on the inputs 240 to the information handling system 200 and the computer-implemented application 209, the input sensitivity 250 of the inputs 240. Specifically, the system states 224 of the storage device 210 can be updated to indicate the input sensitivities 250 for the inputs 240.

In some examples, the input sensitivity management computing module 204 can provide the data indicating the input sensitivity 250 of the inputs 240 to the input prioritization computing module 206. The input prioritization computing module 206 can rank the inputs 240 based on the input sensitivity 250 for each of the inputs 240. For example, the input prioritization computing module 206 can rank the inputs 240 from a highest sensitivity of the inputs 240 to the lowest sensitivity of the inputs 240 based on the input sensitivity 250 of the inputs 240. Based on the ranking of the inputs 240, the input prioritization computing module 206 can determine an input prioritization 252 of the inputs 240. That is, the input prioritization computing module 206 can prioritize the inputs 240 based on the sensitivity of the inputs 240—e.g., the input prioritization computing module 206 prioritizes higher sensitivity inputs 240. For example, when the computer-implemented application 209 includes a gaming application, the input prioritization computing module 206 can rank the inputs 240 based on the sensitivity of the inputs 240 (game controller latency and audio input latency). For example, the input prioritization computing module 206 can rank the game controller latency above the audio input latency.

In some examples, the input prioritization 252 is further based on a current input prioritization and a current system resource utilization, as a well as the ranking of the input sensitivity 250 of the inputs 240. Specifically, in a previous iteration, the current input prioritization is previously determined by the input sensitivity management computing module 204 for previous inputs, similar to that described herein with respect to the input sensitivity 250 for the inputs 240. Further, the current system resource utilization can include the current overall computing load at the information handling system 200—e.g., a percentage of used and unused computing load at the information handling system 200. To that end, the input prioritization computing module 206 can determine the input prioritization 252 of the inputs 240 based on the ranking of the input sensitivity 250 of the inputs 240, the current input prioritization, and the current system resource utilization.

In some examples, the input prioritization computing module 206 provides the input prioritization 252 to the input sensitivity management model 212 forming a feedback loop. Thus, the input sensitivity management computing module 212 can further model the input sensitivity of future inputs 240 to the information handling system 200 based on the input prioritization 252. That is, the input sensitivity management computing module 204 can apply the input sensitivity management model 212 to future inputs, and based on the contextual data 214 and the input prioritization 252, determine the input sensitivity of the future inputs. That is, the input sensitivity management model 212 can model (utilizing machine learning) the input sensitivity of the inputs 240 based on the contextual data 214 to the information handling system 200 (the input sensitivity management model 212 being trained on historical system states 224 and the contextual data 214 as mentioned prior) and the input prioritization 252 of the inputs 240 (based on the previously modeled input sensitivity of the inputs 240 by the input sensitivity management model 212).

In some examples, the input prioritization computing module 206 provides the input prioritization 252 to the workload orchestration computing module 208. The workload orchestration computing module 208 can prioritize computing workloads (processing workloads) of the information handling system 200 based on the input prioritization 252. For example, when the computer-implemented application 209 includes a gaming application, the workload orchestration computing module 208 can increase a frame rate of the game controller inputs (reducing latency) when the game controller input is ranked as a highly-sensitive input (from the input prioritization 252). That is, the output 242 of the gaming application (video stream) is heavily dependent on the game controller inputs, thus reducing latency is of a high priority.

FIG. 3 illustrates a flowchart depicting selected elements of an embodiment of a method 300 for managing input sensitivity of an information handling system. The method 300 may be performed by the information handling system 100, the computing environment 201, the information handling system 200, the input sensitivity management computing module 204, the input prioritization computing module 206, and/or the workload orchestration computing module 208, and with reference to FIGS. 1-2. It is noted that certain operations described in method 300 may be optional or may be rearranged in different embodiments.

The input sensitivity management computing module 204 can perform a calibration and configuration of the input sensitivity management model 212 (302). The input sensitivity management computing module 204 can identify the contextual data 214 associated with the information handling system 200 (304). The input sensitivity management computing module 204 can identify the historic system states 224 of the information handling system 200 (306).

The historic states 224 include, for each state in time of the information handling system 200, inputs 226 to the information handling system 200 and outputs 228 of the information handling system 200 based on the inputs 226 to the information handling system 200. The input sensitivity management computing module 204 can train, based on the contextual data 214 and the historic states 224, the input sensitivity management model 212 for determining an input sensitivity 250 of the inputs to the information handling system 200 (308). The input sensitivity management computing module 204 can perform, after performing the calibration and configuration of the input sensitivity management model 212, a steady-state monitoring of the information handling system (310). The input sensitivity management computing module 204 can monitor the contextual data 214 of the information handling system 200 (312). The input sensitivity management computing module 204 can identify a current state of the information handling system 200 including current inputs 240 to the information handling system 200 and current outputs 242 to the information handling system 200 based on the current inputs 240 to the information handling system 200 (314). The input sensitivity management computing module 204, in response to monitoring the contextual data 214 of the information handling system 200 and based on the current state of the information handling system 200, access the input sensitivity management model 212 to determine the input sensitivity 250 of the current inputs 240 to the information handling system 200 (316). The method 300 can be repeated, for example, when the contextual data 214 is updated, or changed.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for managing input sensitivity of an information handling system, comprising:
    performing a calibration and configuration of an input sensitivity management model, including:
        identifying contextual data associated with the information handling system, the contextual data including i) one or more system characteristics of the information handling system and ii) one or more user characteristics of a user of the information handling system;
        identifying historic states of the information handling system, the historic states including for each state in time of the information handling system, inputs to the information handling system and outputs of the information handling system based on the inputs to the information handling system, the inputs including a latency of inputs, the outputs include a video stream;
        training, based on the contextual data and the historic states, the input sensitivity management model for determining an input sensitivity of the inputs to the information handling system;
    performing, after performing the calibration and configuration of the input sensitivity management model, a steady-state monitoring of the information handling system, including:
        monitoring the contextual data of the information handling system;
        identifying a current state of the information handling system including current inputs to the information handling system and current outputs to the information handling system based on the current inputs to the information handling system, the current inputs including a current latency of inputs, the outputs including a current video stream;
        in response to monitoring the contextual data of the information handling system and based on the current state of the information handling system, accessing the input sensitivity management model to determine the input sensitivity of the current inputs to the information handling system; and
        adjusting, based on the input sensitivity of the current inputs indicated by the input sensitivity management model, a frame rate of the inputs.

2. The computer-implemented method of claim 1, further comprising:
    updating a data store storing the historic states of the information handling system to indicate, based on the current inputs to the information handling system, the corresponding input sensitivities of the current inputs.

3. The computer-implemented method of claim 1, further comprising:
    ranking the current inputs to the information handling system based on the input sensitivity of each of the current inputs.

4. The computer-implemented method of claim 3, further comprising:
    determining a prioritization of the inputs to the information handling system based on the ranking.

5. The computer-implemented method of claim 4, after determining the input sensitivity of the current inputs to the information handling system, prioritizing processing workloads at the information handling system based on the prioritization of the inputs.

6. The computer-implemented method of claim 4, further comprising determining the prioritization of the inputs to the information handling system based on the ranking, a current input prioritization, and a current system resource utilization.

7. The computer-implemented method of claim 1, wherein the one or more system characteristics includes operating environment of the information handling system, information handling system workload, information handling system configuration, network characteristics associated with the information handling system, and resource utilization of the information handling system.

8. An information handling system comprising a processor having access to memory media storing instructions executable by the processor to perform operations comprising, comprising:
    performing a calibration and configuration of an input sensitivity management model, including:
        identifying contextual data associated with the information handling system, the contextual data including i) one or more system characteristics of the information handling system and ii) one or more user characteristics of a user of the information handling system;
        identifying historic states of the information handling system, the historic states including for each state in time of the information handling system, inputs to the information handling system and outputs of the information handling system based on the inputs to the information handling system, the inputs including a latency of inputs, the outputs include a video stream;
        training, based on the contextual data and the historic states, the input sensitivity management model for determining an input sensitivity of the inputs to the information handling system;
    performing, after performing the calibration and configuration of the input sensitivity management model, a steady-state monitoring of the information handling system, including:
        monitoring the contextual data of the information handling system;
        identifying a current state of the information handling system including current inputs to the information handling system and current outputs to the information handling system based on the current inputs to the information handling system, the current inputs including a current latency of inputs, the outputs including a current video stream; and
        in response to monitoring the contextual data of the information handling system and based on the current state of the information handling system, accessing the input sensitivity management model to determine the input sensitivity of the current inputs to the information handling system; and
    adjusting, based on the input sensitivity of the current inputs indicated by the input sensitivity management model, a frame rate of the inputs.

9. The information handling system of claim 8, the operations further comprising:
    updating a data store storing the historic states of the information handling system to indicate, based on the current inputs to the information handling system, the corresponding input sensitivities of the current inputs.

10. The information handling system of claim 8, the operations further comprising:
    ranking the current inputs to the information handling system based on the input sensitivity of each of the current inputs.

11. The information handling system of claim 10, the operations further comprising:
    determining a prioritization of the inputs to the information handling system based on the ranking.

12. The information handling system of claim 11, after determining the input sensitivity of the current inputs to the information handling system, prioritizing processing workloads at the information handling system based on the prioritization of the inputs.

13. The information handling system of claim 11, the operations further comprising
    determining the prioritization of the inputs to the information handling system based on the ranking, a current input prioritization, and a current system resource utilization.

14. The information handling system of claim 8, wherein the one or more system characteristics includes operating environment of the information handling system, information handling system workload, information handling system configuration, network characteristics associated with the information handling system, and resource utilization of the information handling system.

15. A non-transitory computer-readable medium storing software comprising instructions executable by one or more computers which, upon such execution, cause the one or more computers to perform operations comprising:
    performing a calibration and configuration of an input sensitivity management model, including:
        identifying contextual data associated with an information handling system, the contextual data including i) one or more system characteristics of the information handling system and ii) one or more user characteristics of a user of the information handling system;
        identifying historic states of the information handling system, the historic states including for each state in time of the information handling system, inputs to the information handling system and outputs of the information handling system based on the inputs to the information handling system, the inputs including a latency of inputs, the outputs include a video stream;
        training, based on the contextual data and the historic states, the input sensitivity management model for determining an input sensitivity of the inputs to the information handling system;
    performing, after performing the calibration and configuration of the input sensitivity management model, a steady-state monitoring of the information handling system, including:
        monitoring the contextual data of the information handling system;
        identifying a current state of the information handling system including current inputs to the information handling system and current outputs to the information handling system based on the current inputs to the information handling system, the current inputs including a current latency of inputs, the outputs including a current video stream; and
        in response to monitoring the contextual data of the information handling system and based on the current state of the information handling system, accessing the input sensitivity management model to determine the input sensitivity of the current inputs to the information handling system; and adjusting, based on the input sensitivity of the current inputs indicated by the input sensitivity management model, a frame rate of the inputs.

16. The non-transitory computer-readable medium of claim 15, the operations further comprising:

updating a data store storing the historic states of the information handling system to indicate, based on the current inputs to the information handling system, the corresponding input sensitivities of the current inputs.

17. The non-transitory computer-readable medium of claim 15, the operations further comprising:

ranking the current inputs to the information handling system based on the input sensitivity of each of the current inputs.

18. The non-transitory computer-readable medium of claim 17, the operations further comprising:

determining a prioritization of the inputs to the information handling system based on the ranking.

19. The non-transitory computer-readable medium of claim 18, after determining the input sensitivity of the current inputs to the information handling system, prioritizing processing workloads at the information handling system based on the prioritization of the inputs.

20. The non-transitory computer-readable medium of claim 18, the operations further comprising determining the prioritization of the inputs to the information handling system based on the ranking, a current input prioritization, and a current system resource utilization.

* * * * *